United States Patent [19]
Chien

[11] Patent Number: 5,947,325
[45] Date of Patent: Sep. 7, 1999

[54] HOUSING WITH FINGER GROOVES TO FACILITATE LIFTING OF THE SAME

[76] Inventor: Cheng-Chuan Chien, No. 522, Chung-Li Rd., Tso-Ying Dist., Kaohsiung City, Taiwan

[21] Appl. No.: 09/013,435

[22] Filed: Jan. 26, 1998

[51] Int. Cl.⁶ .................................................. A65D 1/12
[52] U.S. Cl. ........................ 220/771; 220/772; 220/752
[58] Field of Search .................................. 220/771, 772, 220/755, 752

[56] References Cited

U.S. PATENT DOCUMENTS

| | | | |
|---|---|---|---|
| 3,198,377 | 8/1965 | Buckley | 220/771 |
| 3,506,154 | 4/1970 | Barnes | 220/771 |
| 3,628,684 | 12/1971 | Sere | 220/771 |
| 4,967,918 | 11/1990 | Long | 220/771 |
| 5,191,994 | 3/1993 | Stauble | 220/771 |

*Primary Examiner*—Joseph M. Moy
*Attorney, Agent, or Firm*—Ladas & Parry

[57] ABSTRACT

A housing includes opposite side walls, each of which has an outer wall surface formed with an elongated horizontally extending finger groove adapted for insertion of four fingers on one hand of a person lifting the housing. The outer wall surface of each of the side walls is further formed with a thumb groove disposed above the finger groove and located midway of the finger groove. The thumb groove is adapted for insertion of a thumb on the hand of the person lifting the housing.

3 Claims, 5 Drawing Sheets

HOUSING WITH FINGER GROOVES TO FACILITATE LIFTING OF THE SAME

BACKGROUND OF THE INVENTION

1. Field of the Invention

The invention relates to a housing, more particularly to a housing with finger grooves to facilitate lifting of the same.

2. Description of the Related Art

Currently, the housings of most household appliances, such as drinking water dispensers, television sets, dish drying devices and the like, have opposite side walls formed with flat outer wall surfaces. Thus, lifting of the household appliance is done by handling the same at the bottom side of the housing. For housings that are made of metal, the rough edges at the bottom side of the housing may cut the hands of the person lifting the housing. For housings that are made of plastic, the smooth wall surfaces of the housing make it difficult to handle the latter in a stable manner.

Referring to FIGS. 1 and 2, to overcome the above drawbacks, it has been proposed that the outer wall surfaces of opposite side walls (only one is shown) of the housing 3 of a household appliance be formed with an elongated horizontally extending finger groove 31 adapted for insertion of four fingers 41 on one hand 4 of a person lifting the housing 3. However, stability of the housing 3 when handling the same is still not satisfactory since the tips of the fingers 41 are located along a horizontal line. As a result, slipping of the housing 3 from the hands of the person lifting the same can easily occur.

SUMMARY OF THE INVENTION

Therefore, the object of this invention is to provide a housing having opposite side walls formed with thumb and finger grooves to facilitate firm and stable handling of the housing.

Accordingly, the housing of this invention includes opposite side walls, each of which has an outer wall surface formed with an elongated horizontally extending finger groove adapted for insertion of four fingers on one hand of a person lifting the housing. The outer wall surface of each of the side walls is further formed with a thumb groove which is disposed above the finger groove and which is located midway of the finger groove. The thumb groove is adapted for insertion of a thumb on the hand of the person lifting the housing.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
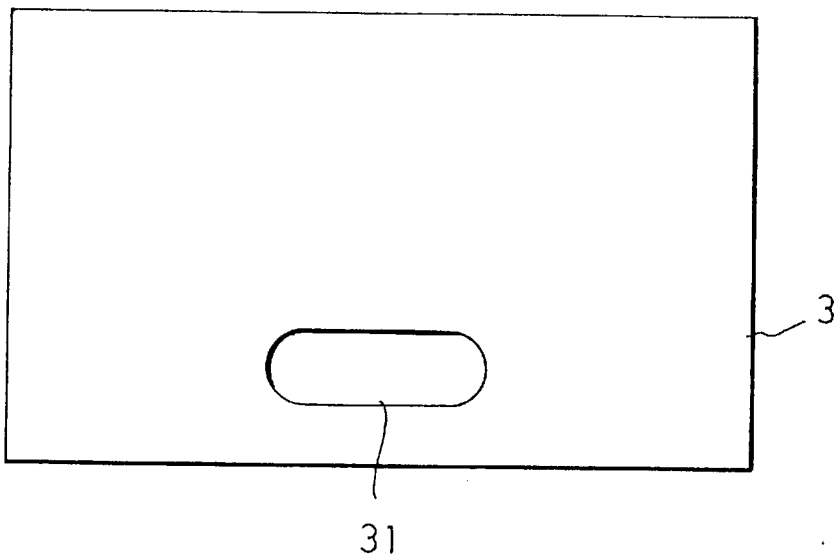
FIG. 1 is a schematic view illustrating a side wall of a conventional housing.
Figure 2:
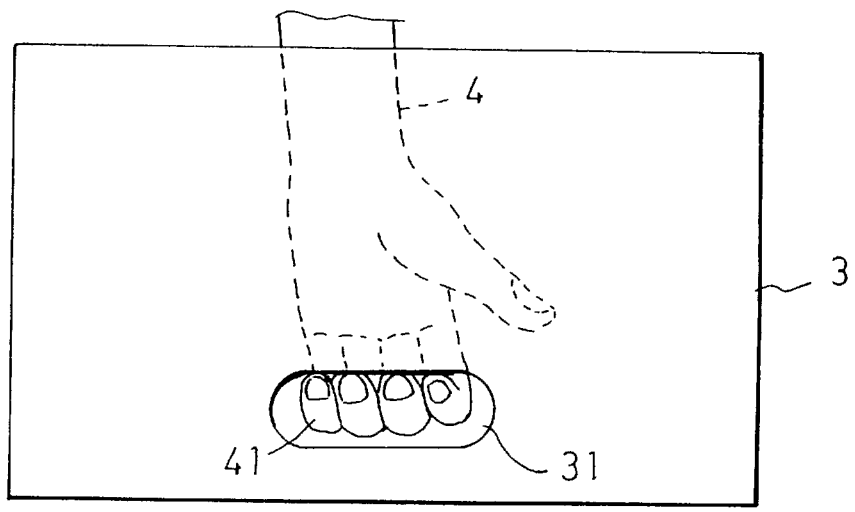
FIG. 2 illustrates how the conventional housing is lifted.
Figure 3:
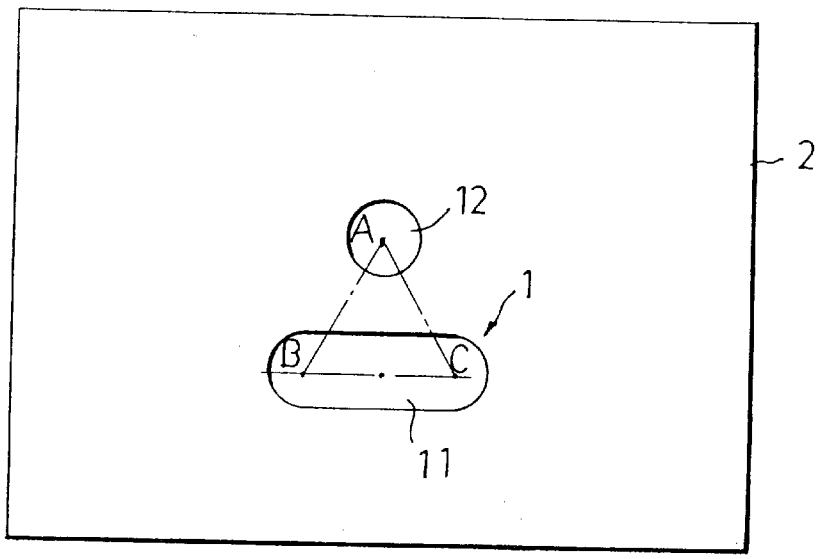
FIG. 3 is a schematic view illustrating a side wall of the preferred embodiment of a housing according to this invention.

Referring to FIGS. 3 to 6, a preferred embodiment of a housing 2 according to this invention is shown to be applied to a drinking water dispenser and includes opposite side walls 1, each of which has an outer wall surface formed with an elongated horizontally extending finger groove 11 adapted for insertion of four fingers 51 on one hand of a person lifting the housing 2. The outer wall surface of each of the side walls 1 is further formed with a thumb groove 12 which is disposed above the finger groove 11 and which is located midway of the finger groove 11. The thumb groove 12 is adapted for insertion of a thumb 52 on the hand of the person lifting the housing 2.

In the preferred embodiment, the distances between a center point A of the thumb groove 12 and center points B, C of opposite end portions of the finger groove 11 are equal. That is to say, line AB is equal to line AC in length. Preferably, line BC is also equal to lines AB and AC in length, thereby forming an equilateral triangle, as best illustrated by the dotted lines in FIG. 3.

Figure 4:
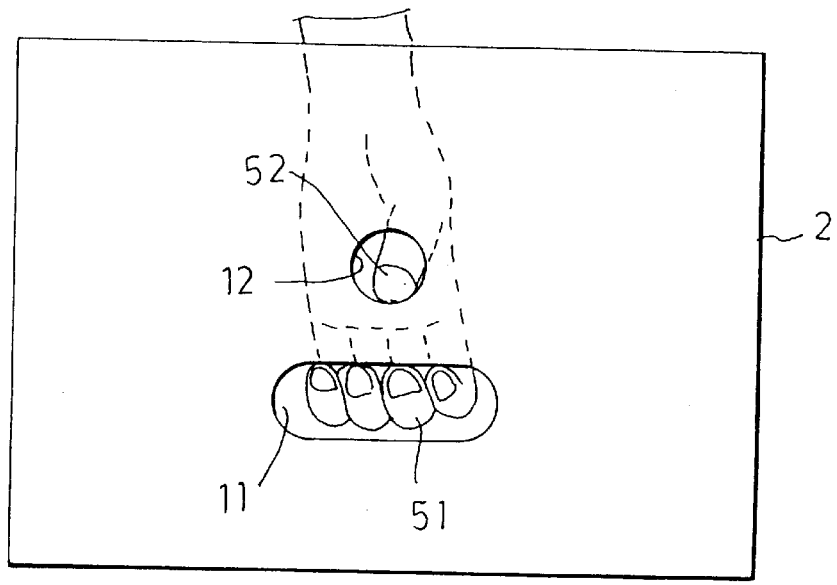
FIG. 4 illustrates how the preferred embodiment is lifted.
Figure 5:
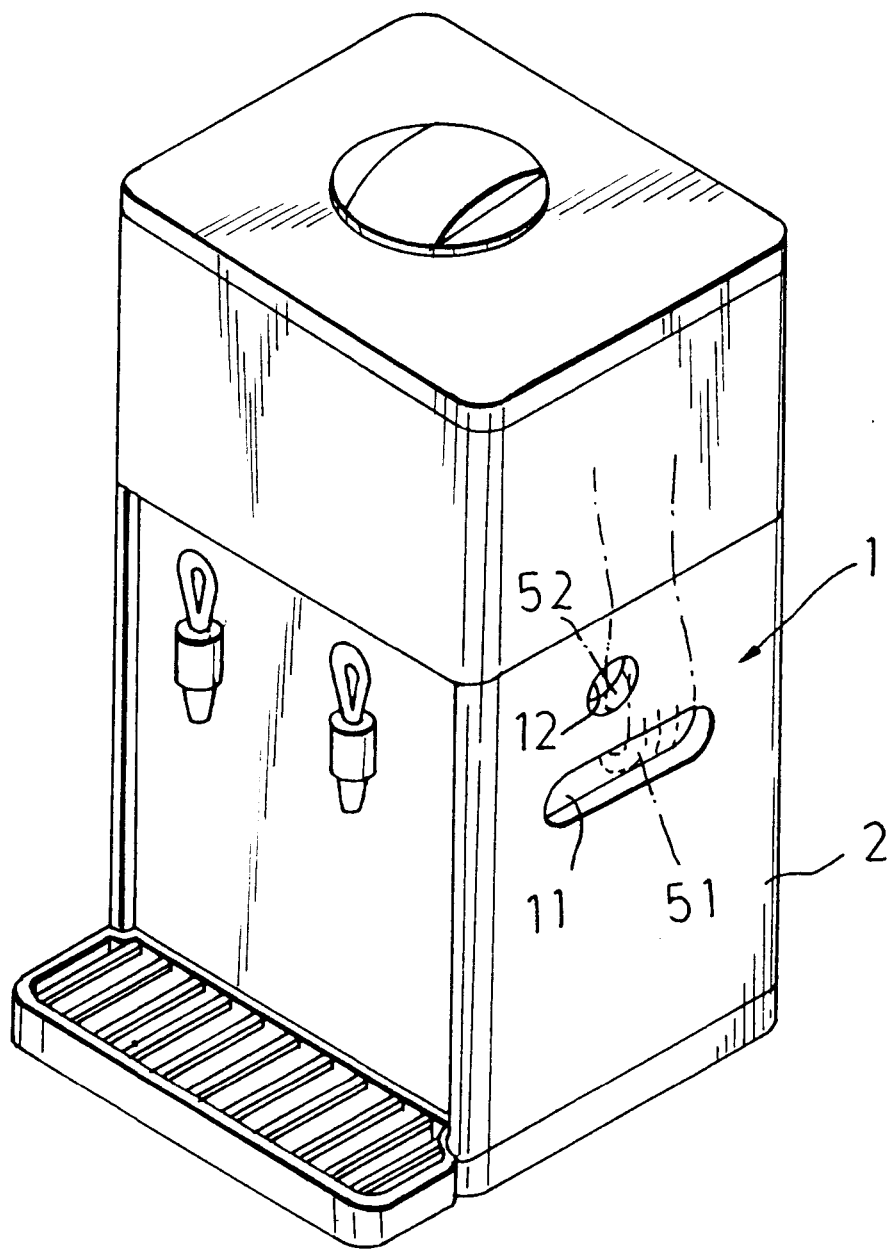
FIG. 5 is a perspective view of the preferred embodiment.
Figure 6:
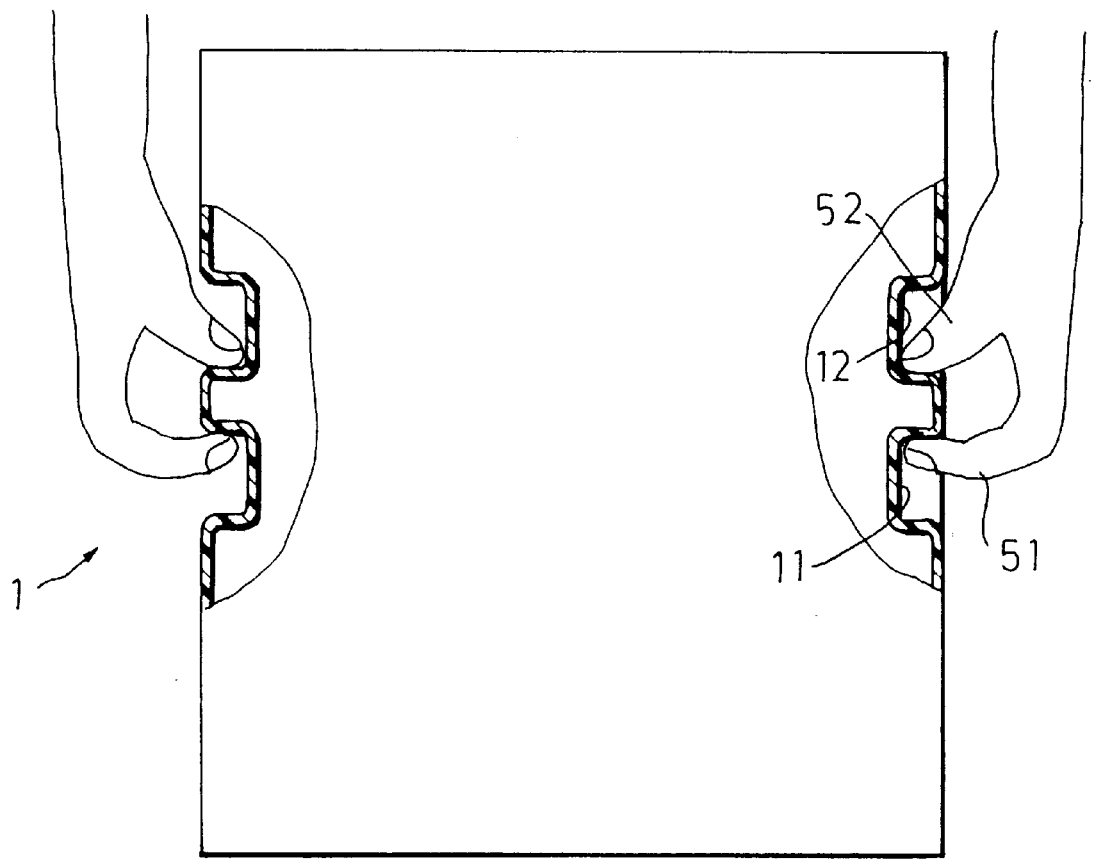
FIG. 6 is a partly sectional, schematic side view illustrating how the preferred embodiment is lifted.

FIGS. 4, 5 and 6 respectively illustrate how the thumb 52 and the four fingers 51 on the hand of a person lifting the housing 2 are inserted into the thumb groove 12 and the finger groove 11 in the side wall 1, respectively. As shown, the thumb 52 applies a downward pressing force at the periphery of the thumb groove 12, while the four fingers 51 cooperatively apply an upward pressing force at the periphery of the finger groove 11, thereby resulting in ergonometric gripping of the housing 2 to facilitate firm and stable handling of the housing 2.

Figure 7:
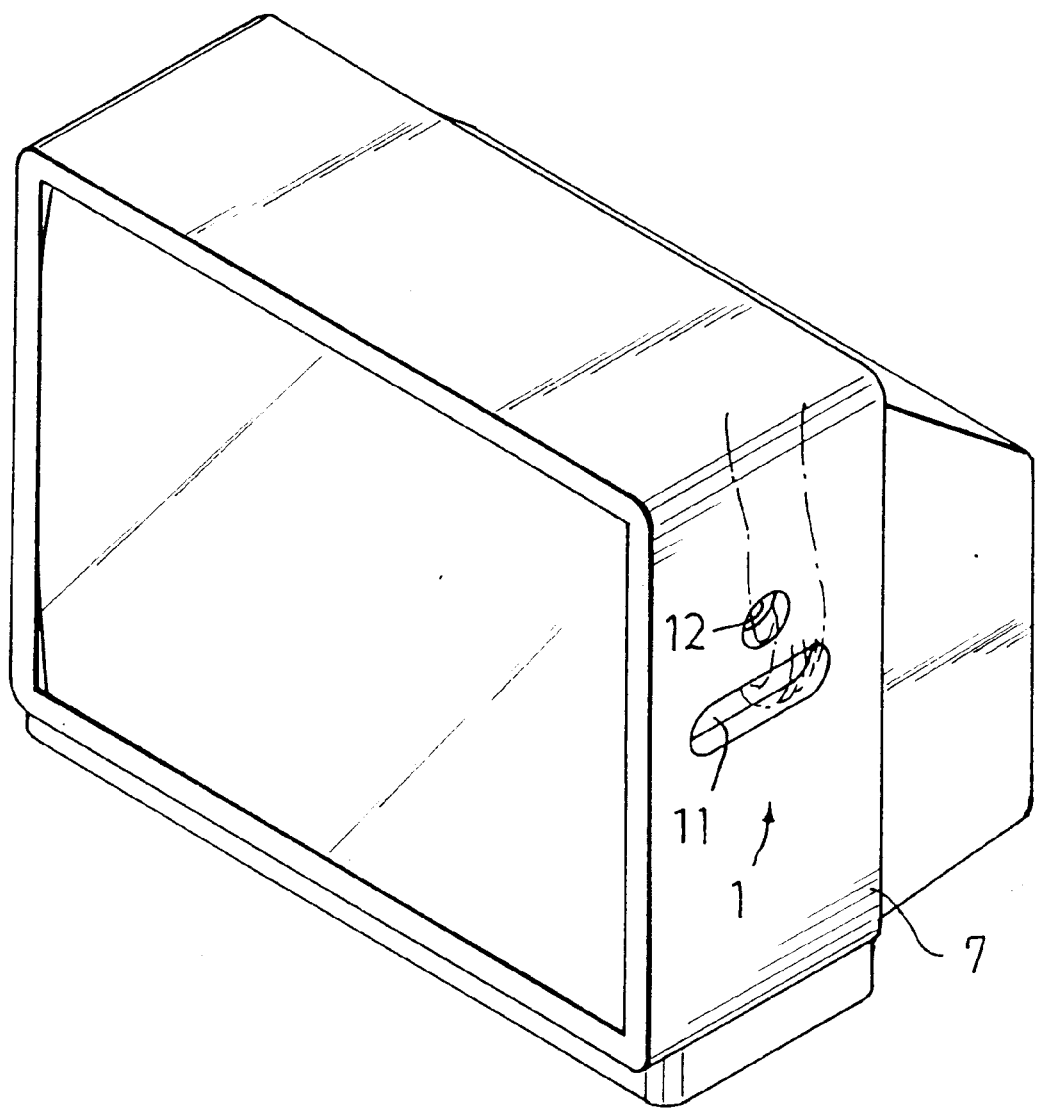
FIG. 7 is a perspective view of a modified housing of this invention.

FIG. 7 illustrates another preferred embodiment of a housing 7 according to this invention. The housing 7 is shown to be applied to a television set, and is provided with an elongated horizontally extending finger groove 11 and a thumb groove 12 in an outer wall surface of each side wall 1 (only one side wall is visible) thereof to facilitate lifting of the housing 7 in a manner similar to that of the previous embodiment.

With this invention thus explained, it is apparent that numerous modifications and variations can be made without departing from the scope and spirit of this invention. It is therefore intended that this invention be limited only as indicated in the appended claims.

I claim:

1. A housing including opposite side walls, each of which has an outer wall surface formed with an elongated horizontally extending finger groove adapted for insertion of four fingers on one hand of a person lifting said housing, wherein said outer wall surface of each said side walls is further formed with a thumb groove disposed above said finger groove and located midway of said finger groove, said thumb groove being adapted for insertion of a thumb on the hand of the person lifting said housing.

2. The housing as claimed in claim 1, wherein distances between said thumb groove and opposite end portions of said finger groove are equal.

3. The housing as claimed in claim 2, wherein distance between said opposite end portions of said finger groove is equal to the distances of said opposite end portions to said thumb groove.

* * * * *